US011293795B1

(12) United States Patent
Wiederoder et al.

(10) Patent No.: US 11,293,795 B1
(45) Date of Patent: Apr. 5, 2022

(54) FLOW METER

(71) Applicant: U.S. Government as Represented by the Secretary of the Army, Natick, MA (US)

(72) Inventors: Michael S. Wiederoder, Boston, MA (US); Eric M. Brack, Holliston, MA (US); Matthew J. Hurley, Framingham, MA (US); Andrew M. Connors, Taunton, MA (US)

(73) Assignee: U.S. Government as Represented by the Secretary of the Army, Washington, DC (US)

( * ) Notice: Subject to any disclaimer, the term of this patent is extended or adjusted under 35 U.S.C. 154(b) by 141 days.

(21) Appl. No.: 16/884,400

(22) Filed: May 27, 2020

(51) Int. Cl.
*G01F 15/06* (2006.01)
*G01F 1/58* (2006.01)
*G01F 3/06* (2006.01)
*G01F 15/063* (2022.01)

(52) U.S. Cl.
CPC ............ *G01F 15/066* (2013.01); *G01F 1/582* (2013.01); *G01F 3/06* (2013.01); *G01F 15/063* (2013.01)

(58) Field of Classification Search
CPC .......... G01F 15/063; G01F 3/06; G01F 1/582; G01F 15/066
USPC ..................................................... 73/861.77
See application file for complete search history.

(56) References Cited

U.S. PATENT DOCUMENTS

| | | | | |
|---|---|---|---|---|
| 2,988,916 A | * | 6/1961 | Waugh ..................... | G01F 1/115 73/861.77 |
| 3,301,053 A | * | 1/1967 | Walch, Jr. ............... | G01F 1/115 73/861.78 |
| 3,534,602 A | * | 10/1970 | Boyd ........................ | G01F 1/11 73/861.78 |
| 5,679,906 A | * | 10/1997 | Van Cleve ................ | G01F 1/80 73/861.353 |
| 6,257,074 B1 | * | 7/2001 | Kellerman .............. | G01F 1/115 73/861.94 |

(Continued)

OTHER PUBLICATIONS

Krzysztof Adamski, Jaroslaw Adamski, Jan A. Dziuban and Rafal Walczak: "Inkjet 3D Printed Miniature Water Turbine Energy Harvester—Flow Meter for Distributed Measurements Systems"; Proceedings, 2017; Presented at the Eurosensors 2017 Conference, Paris, France, Sep. 3-6, 2017; Published Aug. 8, 2017.

*Primary Examiner* — Nathaniel T Woodward

(74) *Attorney, Agent, or Firm* — Roger C. Phillips

(57) ABSTRACT

A personal flow meter for measuring water consumption of an individual has a housing, inductors attached to the exterior of the housing and a rotatable member disposed within the housing. A front cover and rear cover are attached to the housing. The front cover includes a fluid inlet having an angulated internal fluid channel that causes water to enter the housing at an angle. The rear cover has a fluid outlet to allow egress of water within the housing. The rotatable member includes angulated fins. Water entering the housing via the internal fluid channel perpendicularly strikes the fins to initiate rotation of the rotatable member. Magnets are attached to the rotatable member in an alternating magnetic pole arrangement. Rotation of the rotatable member causes the inductors to generate voltage signals. Electronic circuitry processes the voltage signals and generates signals that represents the individual's water consumption over a period of time.

19 Claims, 18 Drawing Sheets

(56) References Cited

U.S. PATENT DOCUMENTS 7,851,775 B2    12/2010  Hoyt et al.
2003/0066361 A1*  4/2003  Kim ..................... G01F 1/115
                                              73/861.79

* cited by examiner

FLOW METER

STATEMENT OF GOVERNMENT INTEREST

The invention described herein may be manufactured and used by or for the Government of the United States of America for governmental purposes without the payment of any royalties thereon or therefor.

CROSS-REFERENCE TO RELATED APPLICATIONS

None.

FIELD OF THE INVENTION

The present invention generally relates to a flow meter for measuring the volume of liquid consumed by a person.

BACKGROUND

Flow meters are typically used to monitor the water consumption of an individual so that an individual will know whether they are properly hydrated. It is critical that an individual stay hydrated during physical activity since dehydration can cause significant harm to an individual's health and performance. Typically, an inlet tube or hose is connected to an inlet of the flow meter and provides water to the flow meter. An outlet tube or hose is connected to the flow meter and receives the water flowing out of the flow meter. The opposite end of the outlet tube or hose is typically positioned in the mouth of the individual. The individual sucks on the tube so as to enable the water to flow into his or her mouth. Conventional flow meters for measuring the volume of water or other liquid flowing therethrough typically require batteries or auxiliary electrical power to power the flow meter. Many conventional flow meters also use impellers to cause liquid to flow through the flow meter. However, such small-scale impellers are expensive to manufacture. Other conventional flow meters are configured to measure changes in pressure or liquid level in order to measure water volume in a container, but such flow meters yield inaccurate measurements unless the flow meter undergoes frequent extensive calibration. Furthermore, many conventional flow meters restrict that rate at which an individual can drink. Other conventional flow meters are configured only for use with custom water bottles. Many of the conventional flow meters are bulky, large in size and have a relatively large footprint.

What is needed is a flow meter configured for personal use and which eliminates the problems and deficiencies of conventional flow meters.

SUMMARY

Described herein are embodiments of a self-powered, personal flow meter that is configured to measure the amount of water consumed by a person thereby allowing that person to determine if they are properly hydrated. The flow meter does not require battery power as do many conventional flow meters. The flow meter is configured to measure the amount of water flowing therethrough during constant vacuum pressure or intermittent vacuum pressure conditions. Therefore, the flow meter may be used for intermittent drinking by the individual and may also be used to measure the volume of water flowing from an indigenous source into a container (e.g. canteen, water bottle, etc.) or similar device. The flow meter is relatively smaller in size than conventional flow meters and may be carried or worn by an individual while he or she is engaging in physical activity. The flow meter has many applications and may be used by athletes, such as runners, bikers and hikers, as well as soldiers and marines out in the field.

In some embodiments, the flow meter comprises a housing having an exterior portion, a front portion, a rear portion, an interior region and an internal support structure within the interior region. The flow meter further comprises a plurality of inductors attached to and consecutively positioned upon the exterior portion of the housing. A front cover is attached to the front portion of the housing and includes a body, an external protruding fluid inlet and an interior section that extends within the interior region of the housing. The external protruding fluid inlet includes a first internal fluid channel having a first opening and a second opening. The second opening is in fluid communication the interior region of the housing such that fluid entering the first opening flows through the first internal fluid channel and into the interior region of the housing. In an exemplary embodiment, the first internal fluid channel narrows in size as the first internal fluid channel extends from the first opening to the second opening. The external protruding fluid inlet is configured so that the first internal fluid channel is angulated with respect to the body of the front cover by a first predetermined angle so that the fluid exiting the second opening of the first internal fluid channel enters the interior region of the housing at the first predetermined angle. The flow meter further comprises a rotatable member disposed within the interior region of the housing. The rotatable member is supported by the internal support structure of the housing and the interior section of the front cover so as to allow the rotatable member to rotate about a rotational axis. The rotatable member includes a plurality of fins that are oriented so that fluid entering the interior region via the second opening of the first internal fluid channel strikes the fins thereby causing the rotatable member to rotate. The flow meter further comprises a plurality of magnets that are attached to the rotatable member in an alternating magnetic pole arrangement and positioned with respect to the inductors so that rotation of the rotatable member causes the inductors to generate voltage signals. The flow meter includes a rear cover that is attached to the rear portion of the housing. The rear cover includes an external protruding fluid outlet. The external protruding fluid outlet includes a second internal fluid channel having a first opening in fluid communication with the interior region of the housing and a second opening to allow fluids to exit the first internal fluid channel. Fluids within the interior region of the housing exit the interior region via the second internal fluid channel. Whereby, fluid flowing into the first internal fluid channel strikes the fins at the predetermined angle so as to cause rotation of the rotatable member wherein movement of the magnets with respect to the inductors causes the inductors to generate voltage signals and whereby the fluid that causes rotation of the rotatable member flows through the interior region of the housing and into the second internal fluid channel. In an exemplary embodiment, the rotatable member includes a front side facing the interior portion of the front cover and a rear side facing the internal support structure of the housing and the first internal fluid channel is angulated with respect to the front side of the rotatable member by the first predetermined angle. In some embodiments, the front side of the rotatable member includes a plurality of recessed regions, wherein each fin is located within a corresponding recessed region and is angulated inward with respect to the front side by a second predetermined angle. In an exemplary embodiment, the first predetermined angle is about 45° and the second predetermined angle is about 45° so that fluid exiting the first internal fluid channel perpendicularly strikes the fins. In an exemplary embodiment, each inductor generates an AC voltage signal during rotation of the rotatable member and the flow meter includes conversion circuitry to convert the AC voltage signal generated by each inductor into a DC voltage and sum the DC voltages to generate a cumulative DC voltage. Measurement circuitry converts the cumulative DC voltage into an electrical signal that represents the volume of fluid flowing through the interior region of the housing. In some embodiments, wireless communication circuitry wirelessly transmits the electrical signal representing the volume of fluid flowing through the interior region.

In some embodiments, the flow meter comprises a housing that comprises an exterior portion, an interior region and a housing opening in communication with the interior region. The housing includes a section that is opposite the housing opening and which has an interior surface facing the interior region. A first protrusion protrudes from the interior surface. The housing further includes an external protruding fluid inlet having a first internal fluid channel. The first internal fluid channel has a first opening, a second opening that is in fluid communication with the interior region of the housing and a first longitudinally extending axis. Fluid entering the first opening of the first internal fluid channel flows through the first internal fluid channel and then flows out of the second opening into the interior region of the housing. In an exemplary embodiment, the first internal fluid channel narrows in size as the first fluid channel extends from the first opening to the second opening. The housing further includes an external protruding fluid outlet having a second internal fluid channel. The second internal fluid channel has a first opening in fluid communication with the interior region, a second opening to allow fluid to exit the second internal fluid channel and a second longitudinally extending axis that is orthogonal to the first longitudinally extending axis of the first internal fluid channel. The flow meter further comprises a plurality of inductors that are attached to and consecutively positioned upon the exterior portion of the housing. A cover is attached to the housing to cover the housing opening. The cover has an interior side that faces the interior region. A second protrusion protrudes from the interior side of the cover and is coaxially aligned with the first protrusion. The flow meter further comprises a rotatable member disposed within the interior region of the housing and rotatable upon the first protrusion and the second protrusion. The rotatable member comprises a peripheral portion having a plurality of consecutively positioned fluid receptacles. Each fluid receptacle has inner walls that are oriented so that fluid entering the interior region via the second opening of the first internal fluid channel strikes the inner walls thereby causing the rotatable member to rotate. The flow meter further comprises a plurality of magnets that are attached to the rotatable member in an alternating magnetic pole arrangement and positioned with respect to the inductors so that rotation of the rotatable member causes the inductors to generate voltage signals. Whereby, fluid flowing into the first internal fluid channel flows through the first internal fluid channel and then strikes the inner walls of the fluid receptacles causing rotation of the rotatable member. The resulting movement of the magnets with respect to the inductors causes the inductors to generate voltage signals. The incoming fluid that causes rotation of the rotatable member continues to flow through the interior region of the housing and then enters the second internal fluid channel wherein the fluid exits the flow meter. In an exemplary embodiment, each inductor generates an AC voltage signal during rotation of the rotatable member and the flow meter includes conversion circuitry to convert the AC voltage signal generated by each inductor into a DC voltage and sum the DC voltages to generate a cumulative DC voltage. Measurement circuitry converts the cumulative DC voltage into an electrical signal that represents the volume of fluid flowing through the interior region of the housing. In some embodiments, wireless communication circuitry wirelessly transmits the electrical signal representing the volume of fluid flowing through the interior region of the housing.

DESCRIPTION

It is to be understood that the terminology used herein is for the purpose of describing particular embodiments by way of example only and is not intended to limit the disclosed embodiments. As used herein, the terms "comprises", "comprising", "includes", "including", "has", "having" or any other variation thereof, are intended to cover a non-exclusive inclusion. For example, a process, method, article or apparatus that comprises a list of elements is not necessarily limited to only those elements, but may include other elements not expressly listed or inherent to such process, method, article or apparatus. Also, as used in the specification, including the appended claims, the singular forms "a", "an" and "the" include the plural. Any numerical parameters set forth in the specification and attached claims are approximations (for example, by using the term "about") that may vary depending upon the desired properties sought to be obtained by the present invention. All ranges of numerical values are inclusive.

It is to be understood that throughout this description, terms such as "vertical", "horizontal", "top", "bottom", "upper", "lower", "middle", "above", "below" and the like are used for convenience in identifying relative locations of various components and surfaces relative to one another in reference to the drawings and are not intended to be limiting in any way.

Figure 13:
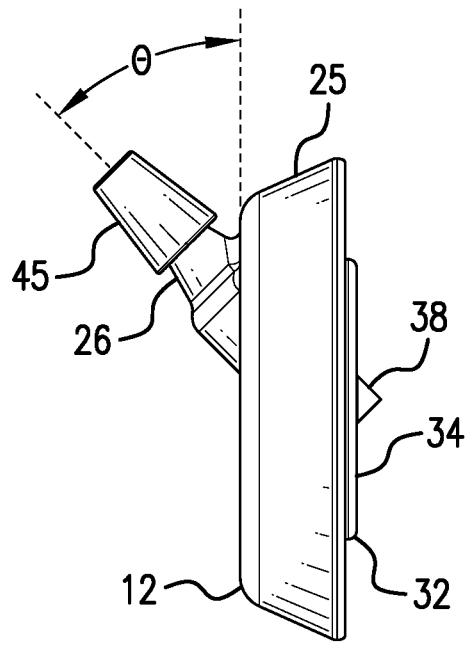
FIG. 13 is a side elevational view of the front cover shown in FIGS. 1, 2 and 5.
Figure 14:
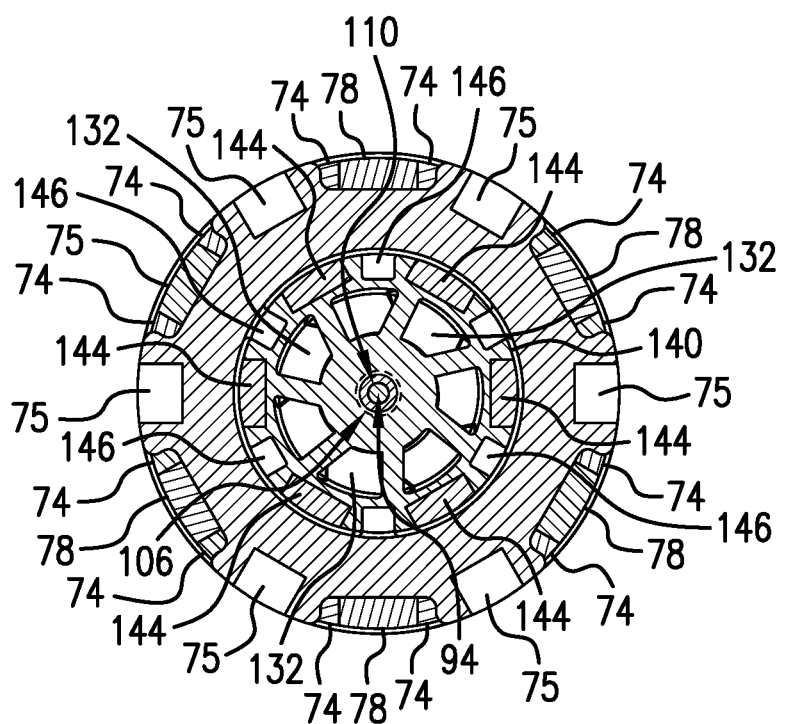
FIG. 14 is a cross-sectional view taken along line 14-14 in FIG. 2.

Referring to FIGS. 1-8, there is shown self-powered, personal flow meter 10 in accordance with an exemplary embodiment. Flow meter 10 comprises front cover 12, housing 14 and rear cover 16. Front cover 12 and rear cover 16 are removably attached to housing 14. Housing 14 includes front portion 18 which has threads 19. Housing 14 further includes rear portion 20 which has threads 21. Front cover 12 includes inner threads 22 (see FIG. 5) that are configured to engage threads 19 such that front cover 12 may be screwed onto housing 14. Similarly, rear cover 16 includes inner threads 24 that are configured to engage threads 21 such that rear cover 16 may be screwed onto housing 14. Front cover 12 includes body 25 and external protruding fluid inlet 26. In an exemplary embodiment, body 25 has a substantially circular geometry. In some embodiments, fluid inlet 26 is integral with body 25. In other embodiments, fluid inlet 26 is configured as a separate component and is joined or attached to body 25. Fluid inlet 26 is angulated with respect to body 25 by angle θ as shown in FIG. 13. The purpose of such a configuration is discussed in the ensuing description. Rear cover 16 includes body 27 and external protruding fluid outlet 28. In an exemplary embodiment, body 27 has a substantially circular geometry. In some embodiments, fluid outlet 28 is integral with body 27. In other embodiments, fluid outlet 28 is a separate component that is joined or attached to body 27.

Figure 1:
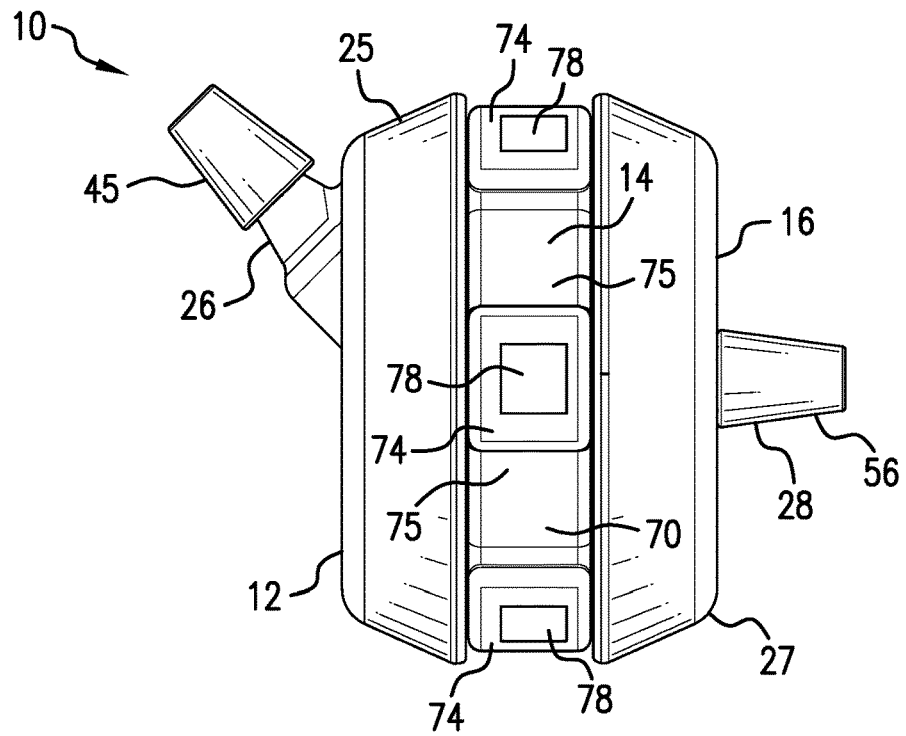
FIG. 1 is a side elevational view of an embodiment of a flow meter.
Figure 2:
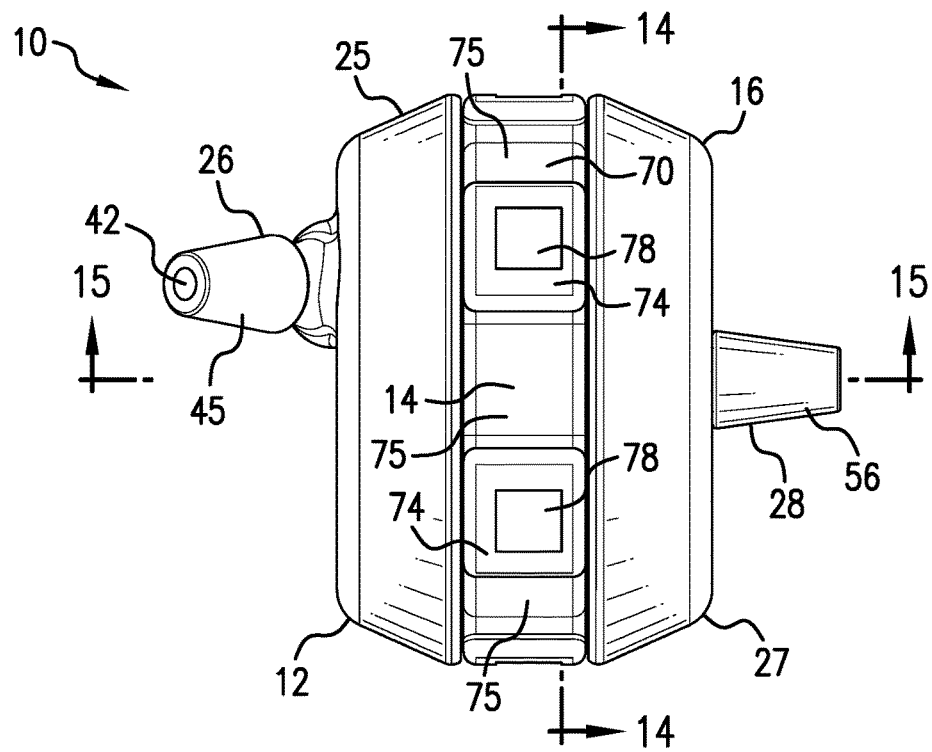
FIG. 2 is a top plan view of the flow meter.
Figure 3:
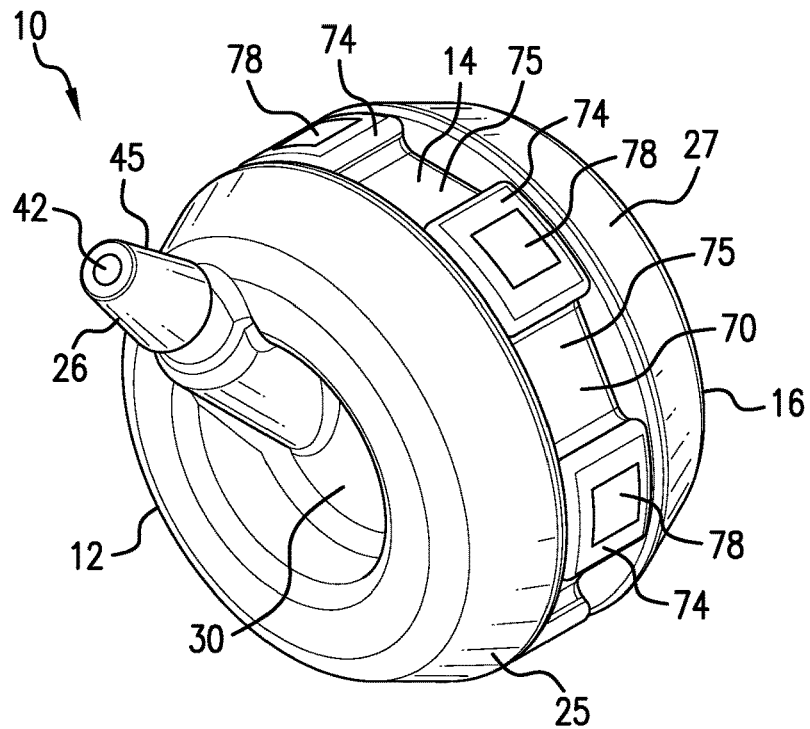
FIG. 3 is a perspective view of the flow meter.
Figure 4:
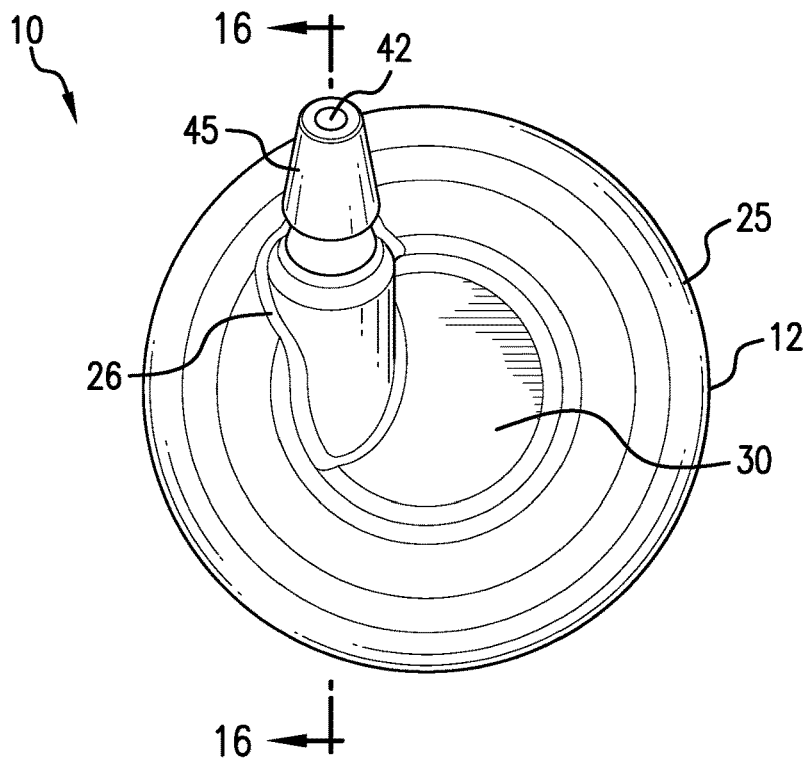
FIG. 4 is a front elevational view of the flow meter.
Figure 5:
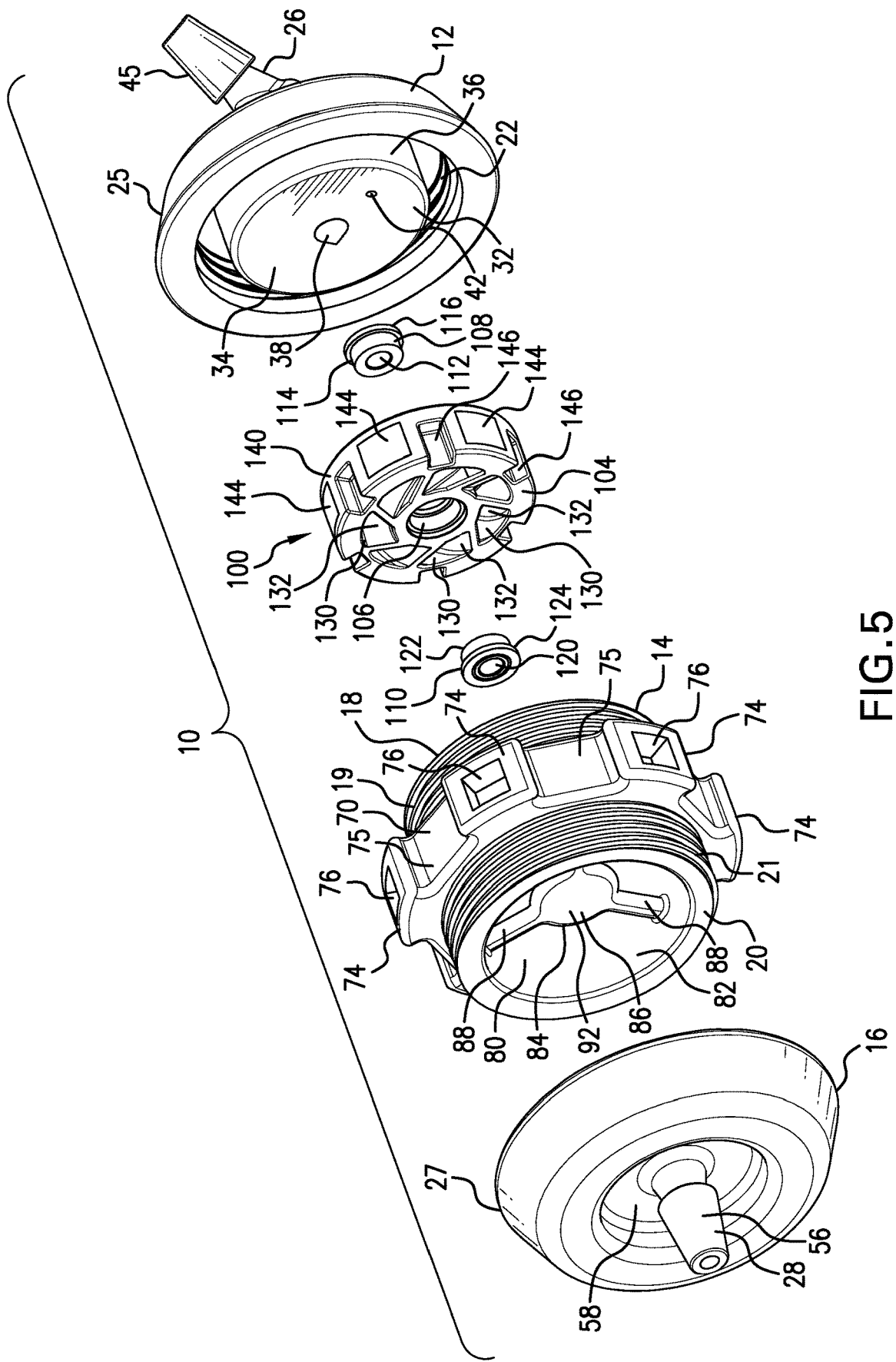
FIG. 5 is an exploded view of the flow meter.
Figure 6:
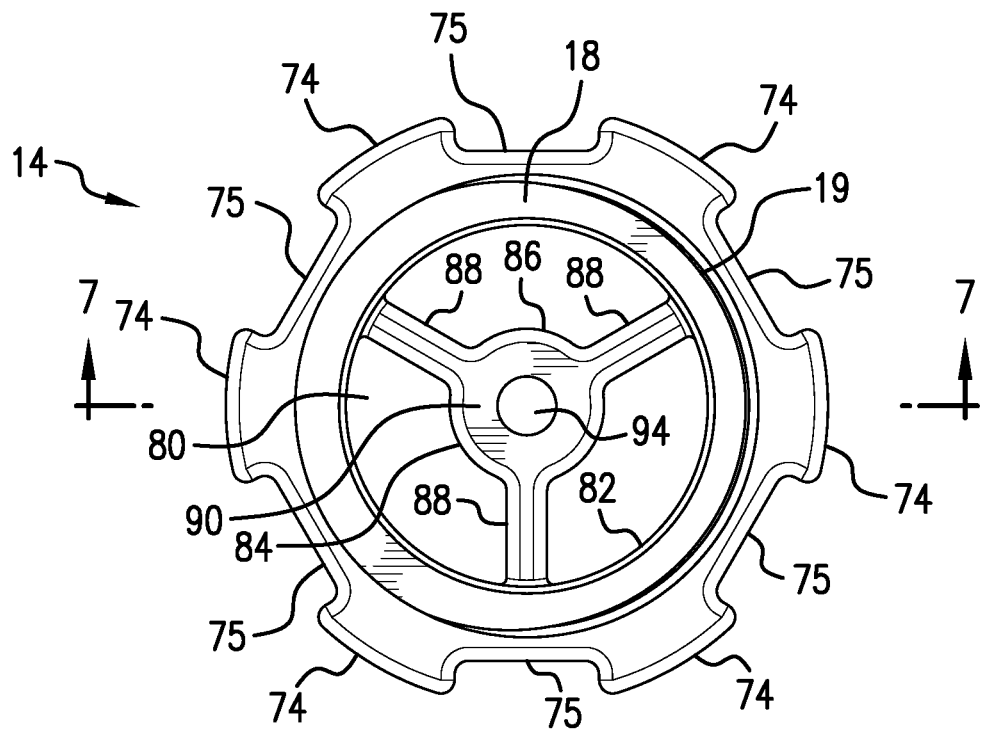
FIG. 6 is a front elevational view of the housing of the flow meter.
Figure 7:
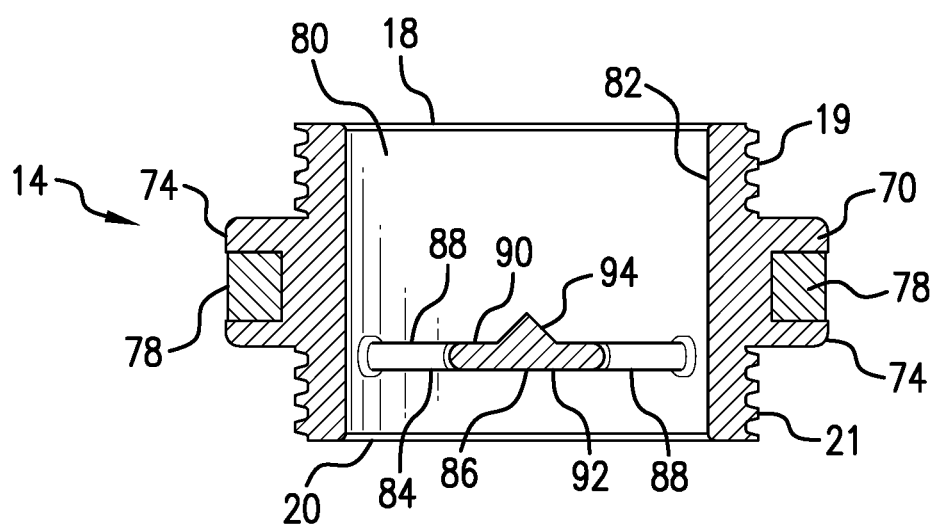
FIG. 7 is a cross-sectional view taken along line 7-7 in FIG. 6.
Figure 8:
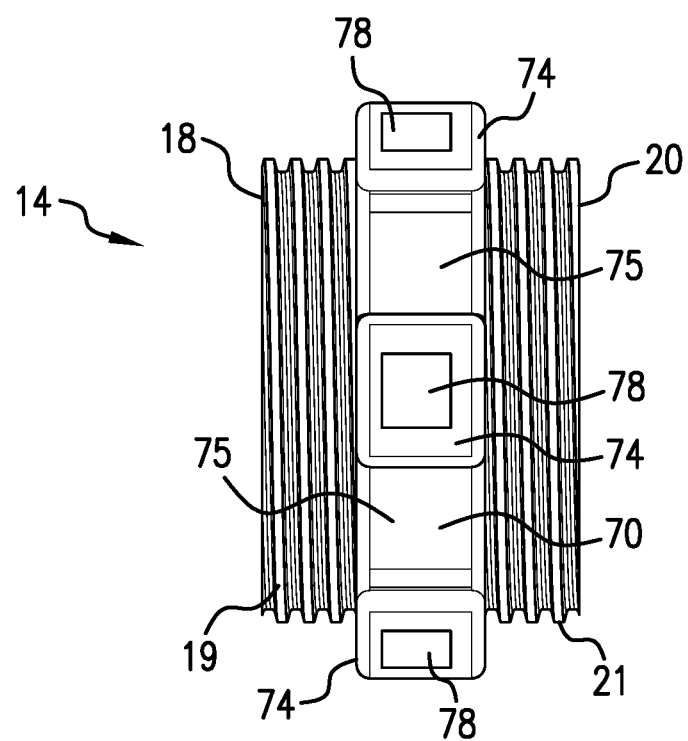
FIG. 8 is a side elevational view of the housing shown in FIGS. 1, 2 and 5.
Figure 9A:
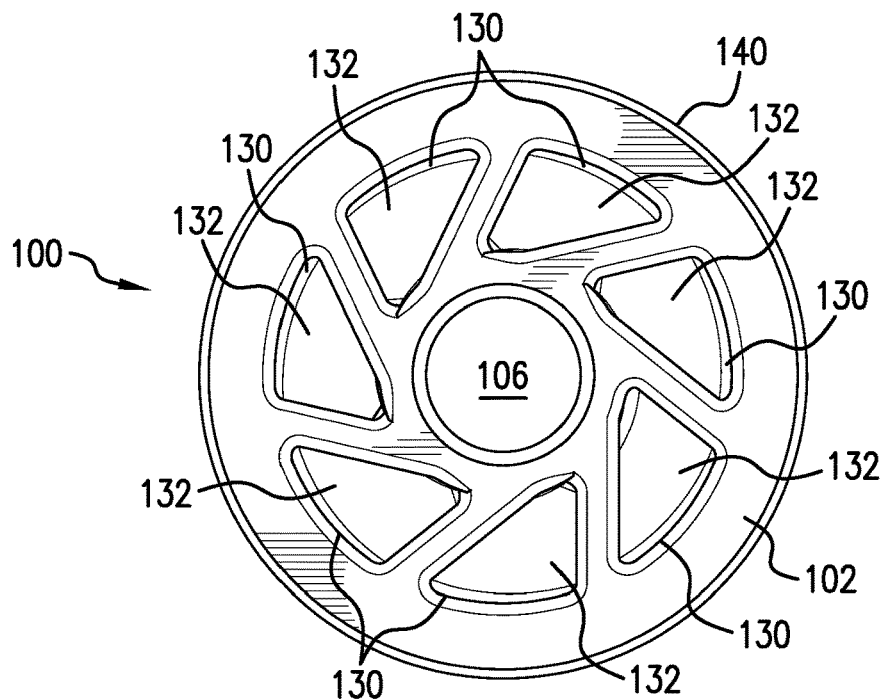
FIG. 9A is a front elevational view of the rotatable member shown in FIG. 5.
Figure 9B:
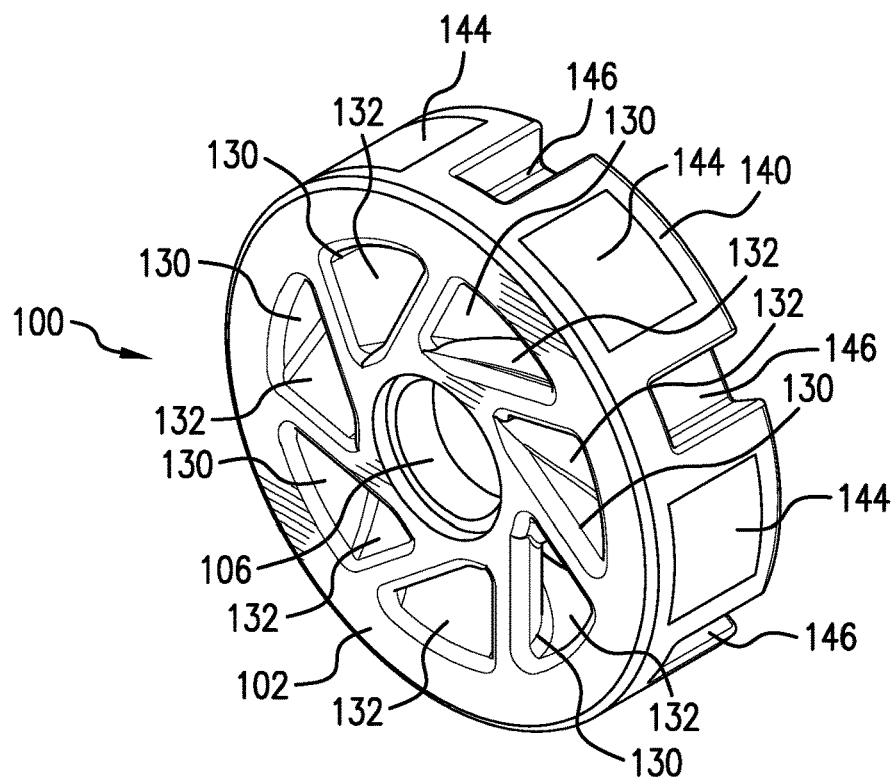
FIG. 9B is a perspective view of the rotatable member.
Figure 10:
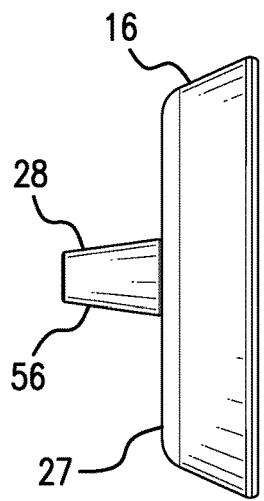
FIG. 10 is a side elevational view of the rear cover shown in FIGS. 1, 2 and 5.
Figure 16:
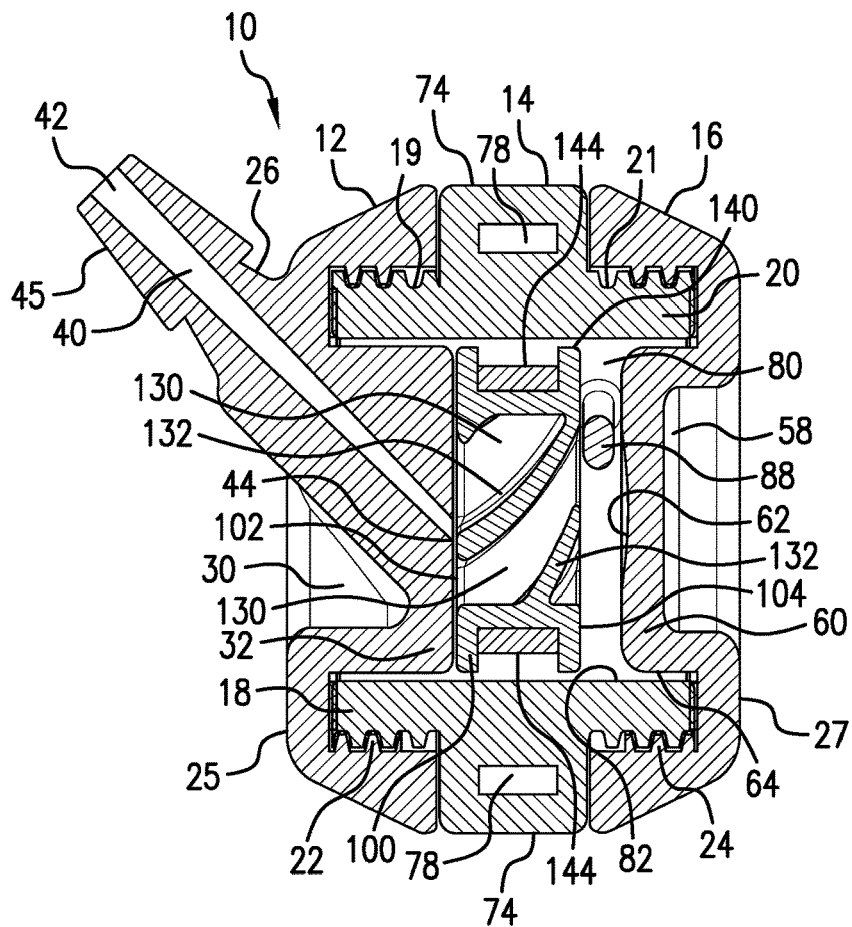
FIG. 16 is a cross-sectional view taken along line 16-16 in FIG. 4.

Referring to FIGS. 4 and 5, front cover 12 includes recess or sunken area 30 which forms substantially circular shaped interior structure 32. Interior structure 32 is spaced apart from inner threads 22. Such spacing allows front cover 12 to be screwed onto first threaded portion 18 of housing 14. Interior structure 32 includes surface 34 and circumferentially extending side or wall 36. Surface 34 includes protrusion or protruding portion 38. Protrusion 38 is substantially centrally located on surface 34. In some embodiments, protrusion 38 is integrally formed with interior structure 32. In other embodiments, protrusion 38 is joined or attached to surface 34. In some embodiments, protrusion 38 has a substantially conical shape. The purpose of protrusion 38 is described in detail in the ensuing description. Referring to FIGS. 5 and 16, external protruding fluid inlet 26 has internal fluid channel 40. Internal fluid channel 40 includes opening 42 and opening 44. Opening 44 is in fluid communication with interior region 80 of housing 14. Thus, fluids entering opening 42 flow through internal fluid channel 40, through opening 44 and into interior region 80. The size of internal fluid channel 40 gradually narrows in the direction of opening 44. In some embodiments, internal fluid channel 40 has a first diameter at opening 42 and a second diameter at opening 44 wherein the second diameter is less than the first diameter. This particular geometry of internal fluid channel 40 causes a directional stream of fluid to exit opening 44. External protruding fluid inlet 26 is angulated with respect to body 25 by angle θ (see FIG. 13) such that internal fluid channel 40 is also angulated with respect to body portion 25 by angle θ. As a result of this configuration, the fluid flowing through internal fluid channel 40 exits opening 44 and enters interior region 80 of housing 14 at angle θ. The purpose of this configuration is described in the ensuing description. External protruding fluid inlet 26 includes portion 45 which is configured to be attached or connected to a fluid conduit such as a tube or hose. In an exemplary embodiment, portion 45 has a generally conical shape to facilitate connection to the tube or hose.

Figure 15:
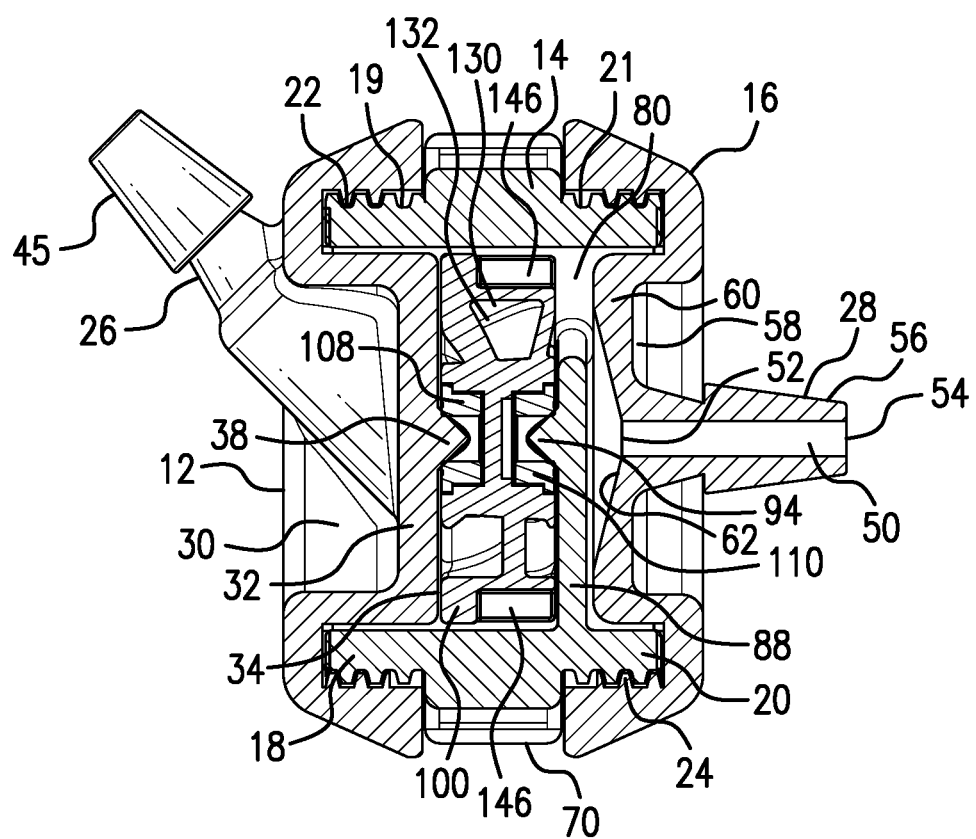
FIG. 15 is a cross-sectional view taken along line 15-15 in FIG. 2.

In an exemplary embodiment, as shown in FIGS. 1, 2, 5, 10 and 15, external protruding fluid outlet 28 of rear cover 16 is substantially coaxial with housing 14 and central opening 106 of rotatable member 100 (see FIG. 15). Fluid outlet 28 includes internal fluid channel 50. Internal fluid channel 50 has opening 52 and opening 54. Opening 52 is in fluid communication with interior region 80 of housing 14. Fluid flows through interior region 80 and into opening 52 wherein the fluid flows through internal fluid channel 50 and then exits via opening 54. Fluid outlet 28 includes portion 56 which is configured to be attached or connected to a drinking tube, hose or similar device (not shown). In an exemplary embodiment, portion 56 has a generally conical shape so as to facilitate connecting fluid outlet 28 to the drinking tube, hose or other flexible tubing.

Figure 11:
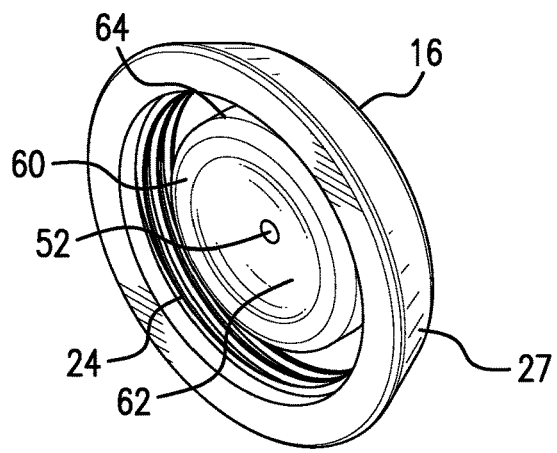
FIG. 11 is a perspective view showing the interior portion of the rear cover.
Figure 12:
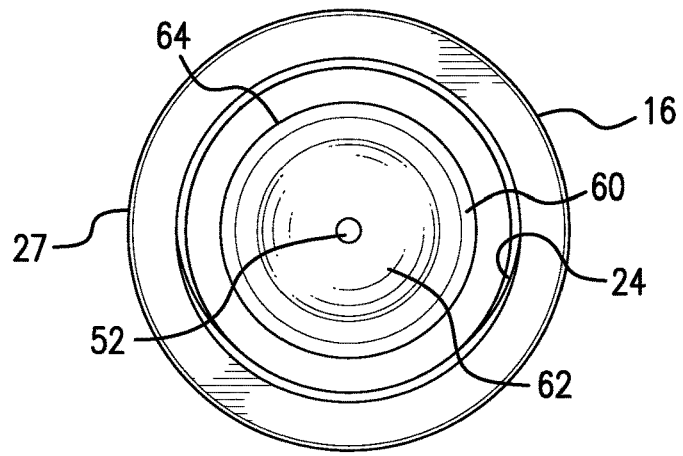
FIG. 12 is a rear elevational view of the rear cover.

Referring to FIGS. 5, 11 and 12, rear cover 16 includes recess or sunken area 58 that forms substantially circular shaped interior structure 60. Interior structure 60 is spaced apart from inner threads 24 so as to allow rear cover 16 to be screwed onto threaded portion 20 of housing 14. Interior structure 60 includes surface 62 and circumferentially extending side or wall 64. Opening 52 of internal fluid channel 50 is centrally located in surface 62. In some embodiments, surface 62 has a substantially concave geometry in order to facilitate the flow of fluid into fluid inlet port 52.

Referring to FIGS. 1, 2, 3, 5 and 6-8, housing 14 includes circumferentially extending central portion 70 that is located between threaded portion 18 and threaded portion 20. Central portion 70 includes a plurality of raised portions or pedestals 74 that are spaced apart by gaps or spaces 75. In some embodiments, raised portions 74 are integral with central portion 70. In other embodiments, raised portions 74 are joined or attached to central portion 70. Raised portions 74 are consecutively positioned along the circumference of central portion 70. In some embodiments, raised portions 74 are equidistantly spaced. Each raised portion 74 has a recess or cavity 76 for receiving a corresponding inductor 78. In order to facilitate understanding of this aspect of the invention, FIG. 5 shows recesses 76 without inductors 78. In an exemplary embodiment, each inductor 78 is a commercially available SMT inductor, model no. SIMID 2220-T inductor which has a ferrite drum core and laser-welded winding. However, the SIMID 2220-T inductor is just one example and other suitable inductors may be used as well. In an exemplary embodiment, each inductor 78 is press fit into a corresponding recess 76. In other embodiments, an epoxy is used to secure each inductor 78 in a corresponding recess 76. Each inductor 78 includes terminals or electrical contacts to which electrical wires may be coupled. In an exemplary embodiment, each inductor 78 is electrically coupled to a pair of electrical wires which are then electrically coupled to electronic circuitry. Such a configuration is discussed in detail in the ensuing description. The number of inductors 78 used in flow meter 10 depends upon the number magnets 144 that are on rotatable member 100. Rotatable member 100 and magnets 144 are discussed in detail in the ensuing description. In an exemplary embodiment, flow meter 10 uses six inductors 78 and six magnets 144. However, in some embodiments, there are less than six magnets 144 and less than six inductors 78. In other embodiments, there are more than six magnets 144 and more than six inductors 78.

Referring to FIGS. 5-8, housing 14 includes interior region or space 80 and interior wall 82 that extends about interior region 80. Housing 14 further includes internal support structure 84 that is configured to support rotatable member 100 that is discussed in detail in the ensuing description. Internal support structure 84 includes hub or central portion 86 and radially extending members 88 that are joined or attached to hub 86 and interior wall 82. In an exemplary embodiment, radially extending members 88 are spaced 120° apart. Hub 86 includes front side 90 (see FIG. 6) and rear side 92 (see FIG. 5). Front side 90 includes protrusion 94 that is centrally located upon front side 90. In an exemplary embodiment, protrusion 94 is substantially conical in shape. The purpose of protrusion 94 is discussed in the ensuing description.

Referring to FIGS. 5, 9A, 9B, 14 and 15, flow meter 10 further comprises rotatable member 100 that is sized to fit within interior region 80 of housing 14. In an exemplary embodiment, rotatable member 100 is configured have a wheel-like geometry. Rotatable member 100 includes front side 102 which faces or confronts interior structure 32 of front cover 12. Rotatable member 100 also includes opposite rear side 104 that that faces or confronts hub 86 of internal support structure 84. Rotatable member 100 includes central opening 106 that is sized for receiving bearings 108 and 110. As shown in FIG. 5, bearing 108 includes central through-hole 112 that is sized for receiving protrusion 38 of interior structure 32. Bearing 108 includes cylindrical shaped portion 114 that is sized for insertion into central opening 106 of rotatable member 100. Bearing 108 further includes flange portion 116 that abuts surface 34 of interior structure 32. Similarly, bearing 110 includes central through-hole 120 that is sized for receiving protrusion 94 of hub 86. Bearing 110 includes cylindrical shaped portion 122 that is sized for insertion into central opening 106 of rotatable member 100. Bearing 110 further includes flange portion 124 that abuts front side 90 of hub 86. Bearings 108 and 110 support and enable smooth rotation of rotatable member 100 about a rotational axis with minimal friction. Rotatable member 100 is configured with a plurality of recesses 130 and a plurality of angulated fins 132, wherein each angulated fin 132 is located within a corresponding recess 130. In some embodiments, each fin 132 is angulated with respect to front side 102 by a degree of angulation that is between about 40° and 50°. In an exemplary embodiment, each fin 132 is angulated about 45° with respect to front side 102. In other embodiments, the degree of angulation of each fin 132 is less than 40°. In further embodiments, the degree of angulation of each fin 132 is more than 50°. In an exemplary embodiment, rotatable member 100 has seven recesses 130 and seven fins 132. In other embodiments, rotatable member 100 may have more than seven recesses 130 and seven fins 132. In further embodiments, rotatable member 100 has less than seven recesses 130 and seven fins 132. In some embodiments, fins 132 are integrally formed with rotatable member 100. In other embodiments, fins 132 are separate components that are attached or joined to rotatable member 100.

Figure 17:
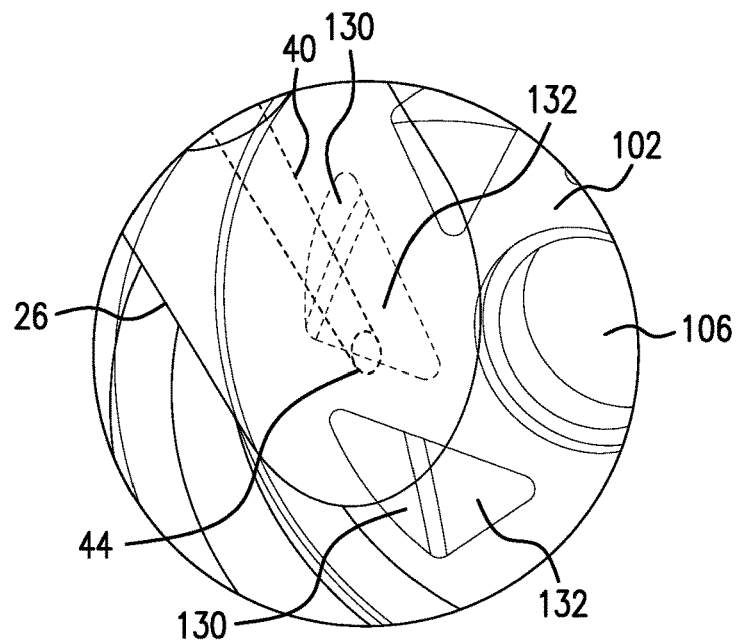
FIG. 17 is an enlarged, partial, perspective view illustrating the position of an internal fluid channel in the front cover with respect to the front side of the rotatable member.

Referring to FIGS. 16 and 17, external protruding fluid inlet 26 is shaped and configured so that opening 44 confronts front side 102 of rotatable member 100. Since internal fluid channel 40 tapers in size from opening 42 to opening 44, the fluid exiting opening 44 is in the form of a fluid stream. The fluid stream strikes front side 102 at angle and, in particular, strikes one of the angulated fins 132 that is in the path of the fluid stream. As a consequence of the fluid stream striking the angulated fin 132, rotatable member 100 starts to rotate. As rotatable member 100 rotates, the fluid stream strikes each of the angulated fins 132 so as to perpetuate the rotation of rotatable member 100. As described in the foregoing description, external protruding fluid inlet 26 is angulated with respect to body 25 by angle θ (see FIG. 13) such that internal fluid channel 40 is also angulated with respect to body portion 25 by angle θ. As a result of this configuration, internal fluid channel 40 is angulated with respect to front side 102 of rotatable member 100 by angle θ and the fluid exits opening 44 at angle θ. In some embodiments, external protruding fluid inlet 26 is configured so that angle θ is between about 40° and 50°. In other embodiments, angle θ is less than 40°. In further embodiments, angle θ is greater than 50°. In an exemplary embodiment, angle θ and each fin 132 is angulated with respect to front side 102 by about 45°. When both internal fluid channel 40 and fins 132 are angulated by about 45°, the narrow fluid stream exiting opening 44 strikes angulated fin 132 at angle that is about 90° (i.e. the fluid stream is perpendicular to fin 132). Such a configuration results in the narrow fluid stream striking angulated fin 132 with maximum force so as to quickly initiate rotation of rotatable member 100. The quick initiation of rotation of rotatable member 100 also contributes to and increases the accuracy of flow meter 10. As rotatable member 100 rotates, the narrow fluid stream also strikes the other fins 132 at a right angle thereby perpetuating rotation of rotatable member 100. After the narrow fluid stream strikes the angulated fins 132, the fluid passes through the spaces or openings between radially extending members 88 and then enters opening 52 of internal fluid channel 50 in external protruding fluid outlet 28. The fluid exits internal fluid channel 50 via opening 54. In an exemplary embodiment, internal fluid channel 50 has a longitudinally extending axis that is substantially coaxial with the rotational axis of rotatable member 100.

Referring to FIGS. 5, 9A, 9B and 14, rotatable member 100 includes circumferentially extending peripheral portion 140. Rotatable member 100 includes a plurality of magnets 144 that are joined or attached to peripheral portion 140 in an alternating magnetic pole arrangement and positioned with respect to inductors 78 so that rotation of rotatable member 100 causes inductors 78 to generate voltage signals. This feature is described in detail in the ensuing description. In an exemplary embodiment, peripheral portion 140 includes a plurality of recesses wherein each magnet 144 is press-fit into a corresponding recess. In other embodiments, each magnet 144 is secured within the corresponding recess with an epoxy. In an exemplary embodiment, each magnet 144 does not extend above surface 142 of peripheral portion 140. In some embodiments, magnets 144 are equidistantly spaced. Each magnet 144 may be any suitable commercially available magnet. In an exemplary embodiment, each magnet 144 is a Neodymium magnet. In an exemplary embodiment, housing 14, internal support structure 84 and rotatable member 100, including angulated fins 132, are fabricated from non-ferromagnetic metals or non-metal materials such as non-toxic plastics and/or composite materials. In an exemplary embodiment, peripheral portion 140 has a plurality of cut-out or notched regions which reduce the weight of rotatable member 100 and the amount of material needed to fabricate rotatable member 100.

Referring to FIGS. 14-18, in order to operate flow meter 10, a tube or hose (not shown) is fluidly coupled or connected to a source of water and to external protruding fluid inlet 26 of front cover 12. The source of water may be a canteen, water bottle, etc. The water flows through the tube and into opening 42. The water then flows through internal fluid channel 40. Since internal fluid channel 40 narrows in size as it approaches opening 44, the water exiting opening 44 is a narrow stream. For purposes of explanation of the operation of flow meter 10, internal fluid channel 40 is angulated about 45° with respect to front side 102 and fins 132 are angulated by about 45° so that the narrow stream perpendicularly strikes fins 132 to create maximum force on fins 132. As result, rotatable member 100 begins to rotate and continues to rotate provided that a stream of water continues to flow out of fluid outlet port 44 and strikes fins 132. The water then passes through spaces between radially extending members 88 of internal support structure 84 and into opening 52 of external protruding fluid outlet 28. The water then flows through internal fluid channel 50 and exits opening 54. A drinking tube (not shown) is fluidly coupled or connected to external protruding fluid outlet 28 so that water flowing out of opening 54 flows into the drinking tube. The drinking tube has a distal end (not shown) that is configured to be inserted into the mouth of a person. When the person wants to drink some water, he or she sucks on the drinking tube to enable water to flow through flow meter 10 and the drinking tube. As rotatable member 100 rotates and magnets 144 pass by inductors 78, each inductor 78 generates an AC (alternating current) voltage signal. Each inductor 78 is electrically coupled to a corresponding rectifier circuit 160, 162, 164, 165, 166 and 168 via wire pairs 170, 172, 174, 175, 176 and 178, respectively. Each rectifier circuit 160, 162, 164, 165, 166 and 168 converts the AC voltage signals into DC (direct current) voltages. In some embodiments, each rectifier circuit comprises a full-wave bridge rectifier circuit which is well known in the electronics field. The DC voltages provided by each rectifier circuit are electrically coupled together and via wires 180 and 182 so as to provide a cumulative DC voltage. Load resistor ($R_L$) 184 is coupled across wires 180 and 182. In an exemplary embodiment, the resistance of load resistor ($R_L$) 184 is between about 50Ω and 60Ω. Energy storage circuit 190 is electrically coupled to wires 180 and 182 and comprises DC voltage storage components, including capacitor 192. In an exemplary embodiment, capacitor 192 has a capacitance of about 4.7 µF. Energy storage circuit 190 includes output terminals 194 and 196 to which other electronic circuitry may be electrically coupled. For example, the electrical power stored in capacitor 192 may be coupled to power management circuitry (not shown) that uses the stored electrical power to charge electrical devices such as a lithium-polymer battery. In some embodiments, energy storage circuit 190 includes a rechargeable battery that is charged by the stored electrical power in capacitor 192. The cumulative DC voltage is applied to the inputs of signal measurement circuitry 200 which converts the cumulative DC voltage into an electrical signal that represents the volume of water flowing through flow meter 10. Thus, the amount of voltage generated over time correlates with the total of amount of water that passes through flow meter 10. For example, if the drinking rate of a person is 200 mL/minute, the electrical signal generated by signal measurement circuitry 200 would be about 200 mV (millivolts) DC in 30 second bursts (~1 mW). In an exemplary embodiment, the electrical signal generated by signal measurement circuitry 200 is converted into a digital signal which is then fed to wireless communication circuitry 202. Wireless communication circuitry 202 communicates a wireless signal that represents the volume of water consumed by the person to another wireless communication device such as a smart phone, tablet computer, notebook computer, iPad® or other remotely located wireless communication device. In an exemplary embodiment, wireless communication circuitry 202 comprises Bluebooth® circuitry.

Referring to FIGS. 19-29, there is shown another exemplary embodiment of the flow meter. Flow meter 300 comprises housing 302 which includes exterior portion 303, interior region 304 and interior wall 305 which extends about interior region 304. Interior wall 305 has a section configured with threads 307. The purpose of threads 307 is discussed in the ensuing description. Housing 302 includes housing opening 308 which is in communication with interior region 304. Housing 302 includes section 310 that is opposite housing opening 308 and which has interior surface 312 that faces interior region 304. Interior surface 312 includes protrusion or protruding portion 314. In some embodiments, protrusion 314 is integrally formed with section 310. In other embodiments, protrusion 314 is a separate component that is attached or joined to interior surface 312. Housing 302 further includes external protruding fluid inlet 316. External protruding fluid inlet 316 includes exterior portion 317. Fluid tubes or hoses may be attached or connected to exterior portion 317. In an exemplary embodiment, exterior portion 317 has a generally conical shape to facilitate the attachment thereto of the fluid tube or hose. The fluid tube or hose is typically in fluid communication with a source of fluid (e.g. water bottle, canteen, etc.). External protruding fluid inlet 316 further includes internal fluid channel 320. Internal fluid channel 320 includes opening 318 and opening 321. Opening 321 is in fluid communication with interior region 304. Fluid (e.g. water) entering opening 318 flows through internal fluid channel 320 and exits opening 321 such that the fluid enters interior region 304. In an exemplary embodiment, internal fluid channel 320 narrows in size as internal fluid channel 320 extends from opening 318 to opening 321. Internal fluid channel 320 has first longitudinally extending axis 322 (see FIG. 28).

Housing 302 further includes external protruding fluid outlet 324. Fluid outlet 324 has portion 325 to which a fluid tube may be attached or connected. This fluid tube is typically a drinking tube. Portion 325 has a generally conical shape to facilitate attachment or connection of the drinking tube. External protruding fluid outlet 324 further includes internal fluid channel 326. Internal fluid channel 326 includes opening 328 and opening 329. Opening 328 is in fluid communication with interior region 304. Internal fluid channel 326 has second longitudinally extending axis 330 that is orthogonal to first longitudinally extending axis 322 (see FIG. 28). Fluid passing through interior region 304 exits the interior region 304 via opening 328. Once the fluid enters opening 328, the fluid flows through internal fluid channel 326 and then exits via opening 329. The fluid then flows through the drinking tube.

As shown in FIGS. 19, 20, 22, 23 and 27-29, flow meter 300 further includes a plurality of raised portions 332 on exterior portion 303 of housing 302, wherein each raised portion 332 includes a recess or cavity. Flow meter 300 includes a plurality of inductors 334. Each inductor 334 is positioned within a recess or cavity of a corresponding raised portion 332. In an exemplary embodiment, inductors 334 are the same type of inductors as inductors 78 described in the foregoing description. In some embodiments, each inductor 334 is press-fitted into the corresponding recess or cavity. In other embodiments, each inductor 334 is secured within a corresponding recess or cavity with an epoxy.

Referring to FIGS. 19-24, flow meter 300 further includes cover 336 that is attached to housing 302 and covers housing opening 308. Cover 336 includes a plurality of raised portions 337 that are separated by spaces 338. Such a configuration facilitates rotating cover 336 and tightening cover 336 to provide a water-tight connection between cover 336 and housing 302. Cover 336 includes exterior side 339 and substantially cylindrical interior portion 340. Interior portion 340 includes threads 342. Threads 342 are configured to engage threads 307 on interior wall 305 of housing 302 so that cover 336 can be screwed onto housing 302. Generally cylindrical interior portion 340 includes surface 344 that faces interior region 304. Interior surface 344 has protrusion 346 extending therefrom. In an exemplary embodiment, protrusion 346 is centrally located on surface 344. In some embodiments, protrusion 346 is integrally formed with substantially cylindrical interior portion 340. In other embodiments, protrusion 346 is attached or joined to surface 344.

Figure 26:
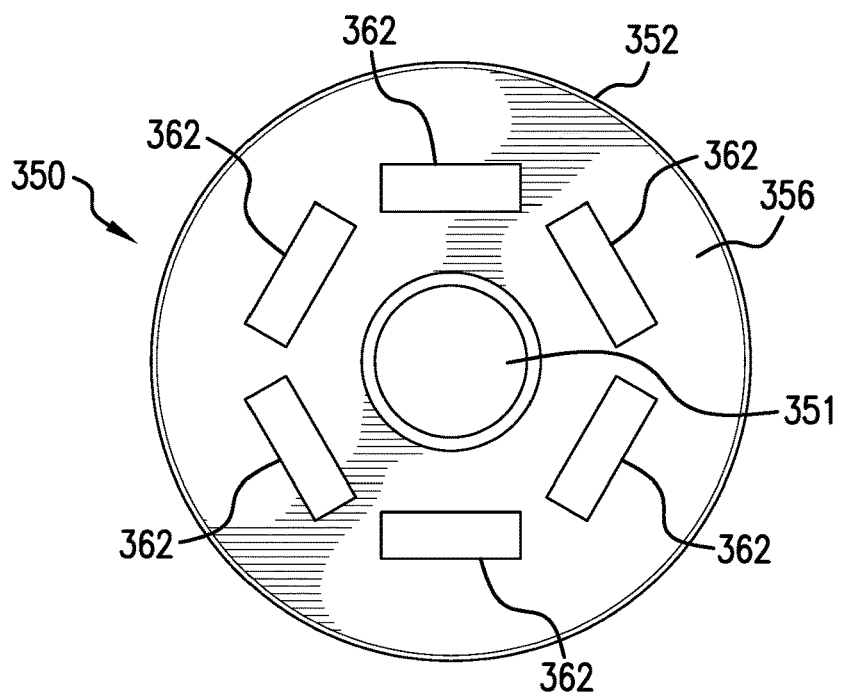
FIG. 26 is a front elevational view of the rotatable member shown in FIG. 25.
Figure 27:
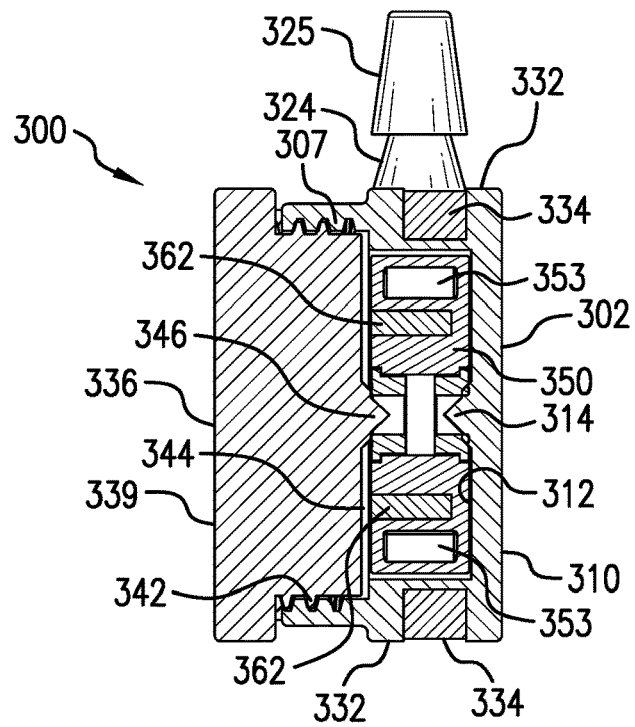
FIG. 27 is a cross-sectional view taken along line 27-27 in FIG. 21.
Figure 28:
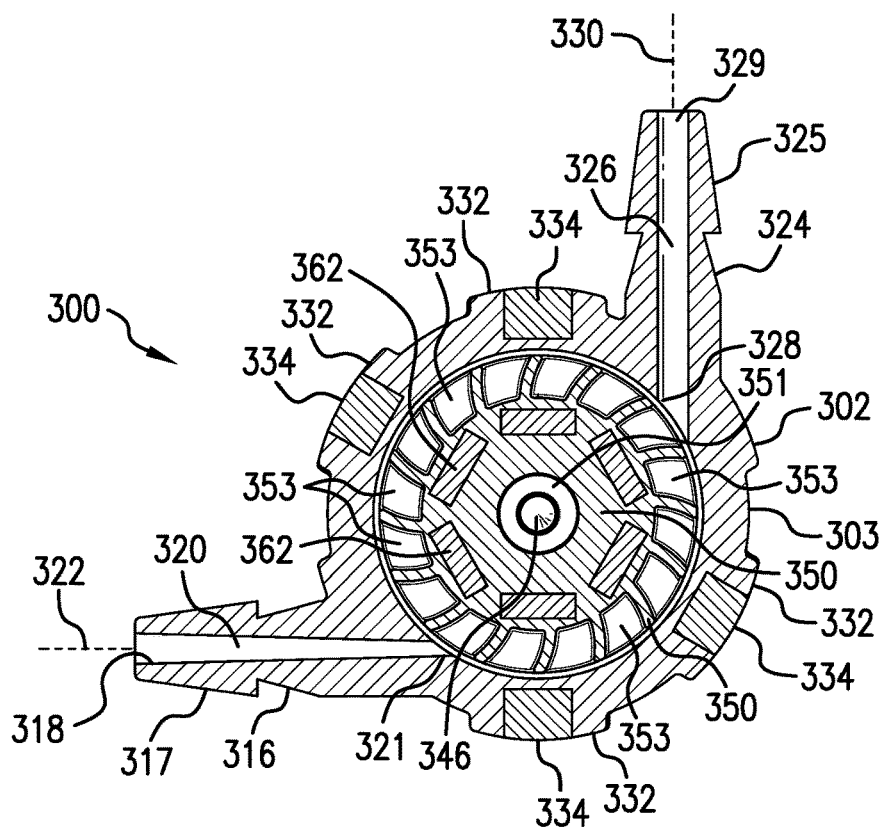
FIG. 28 is a cross-sectional view taken along line 28-28 in FIG. 22.
Figure 29:
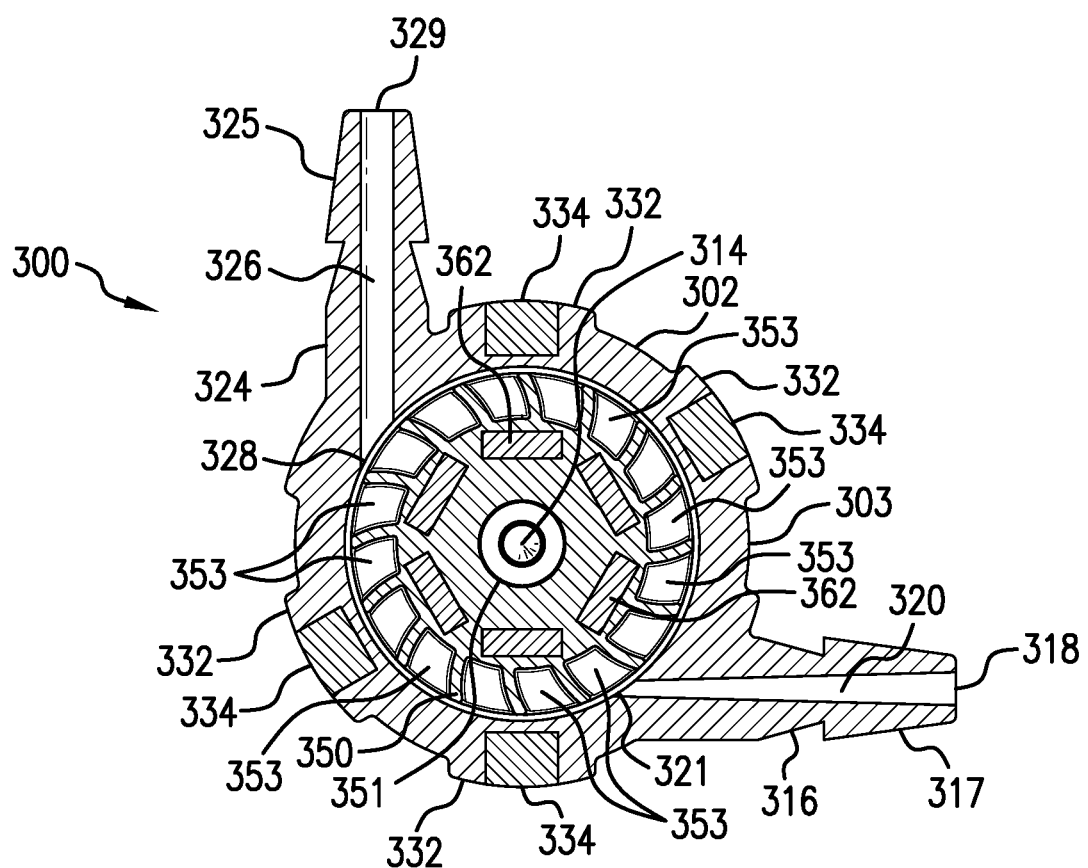
FIG. 29 is a cross-sectional view taken along line 29-29 in FIG. 20.

Referring to FIGS. 25-29, flow meter 300 further includes rotatable member 350 that is rotatably disposed within interior region 304 of housing 302. Rotatable member 350 includes central opening 351 that is sized to receive protrusion 314 on interior surface 312 (see FIG. 27) and protrusion 346 on surface 344 (see FIG. 27). Protrusions 314 and 346 are coaxially aligned and define a rotational axis for rotatable member 350. This configuration allows rotatable member 350 to rotate upon protrusion 314 and protrusion 346. Rotatable member 350 includes peripheral portion 352 that comprises plurality of fluid receptacles 353. Each receptacle 353 has bottom section 354 and inner walls 355. Fluid receptacles 353 are consecutively arranged and oriented so that the narrow stream of fluid exiting opening 321 of internal fluid channel 320 strikes the inner walls 355 of each fluid receptacle 353 thereby causing rotatable member 350 to rotate. Flow meter 300 further includes front side 356 and rear side 358. Front side 356 faces surface 344 and rear side 358 faces interior surface 312. Rotatable member 350 includes a plurality of slots 360 (see FIG. 25) that extend into rotatable member 350. In an exemplary embodiment, each slot 360 is substantially parallel to the rotational axis of rotatable member 350. Each slot 360 is sized to receive a corresponding magnet 362 as shown in FIG. 26. In some embodiments, each magnet 362 is press-fitted into a corresponding slot 360. In other embodiments, each magnet 362 is secured into a corresponding slot 360 with an epoxy. Magnets 362 are positioned in an alternating magnetic pole arrangement and positioned with respect to inductors 334 so that rotation of rotatable member 350 causes inductors 334 to generate AC voltage signals. Pairs of wires (not shown) are electrically coupled to the terminals or electrical contacts of each inductor 334 and provides the AC voltage signals to corresponding rectifier circuits to convert the AC voltage signals to DC voltages signals. The wiring, rectifier circuits, energy storage circuitry, signal measurement circuitry and communication circuitry shown in FIG. 18 may be used with flow meter 300.

Figure 18:
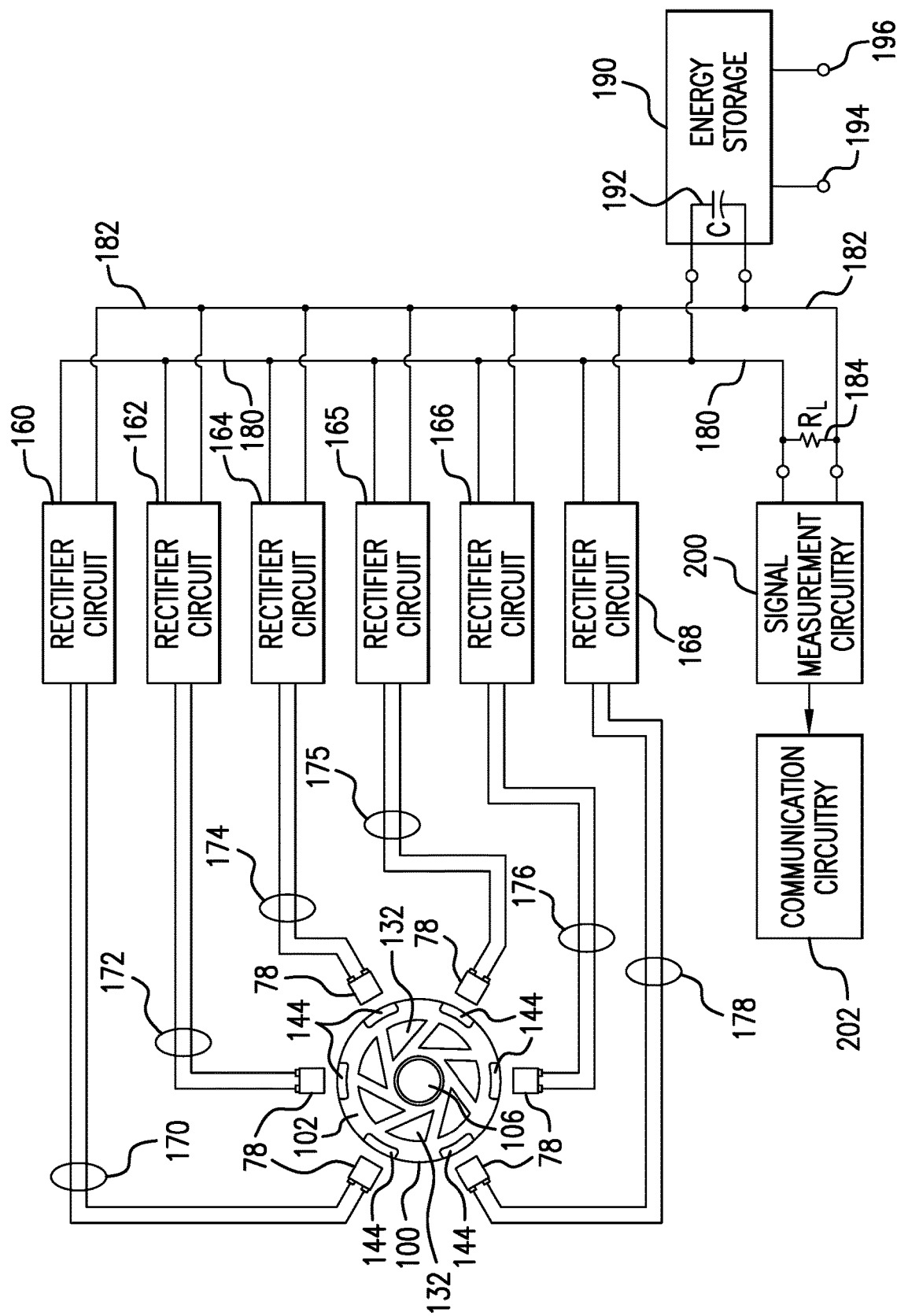
FIG. 18 is an electrical schematic diagram illustrating the generation of voltage signals by the inductors as rotatable member rotates and the processing of such voltage signals.
Figure 19:
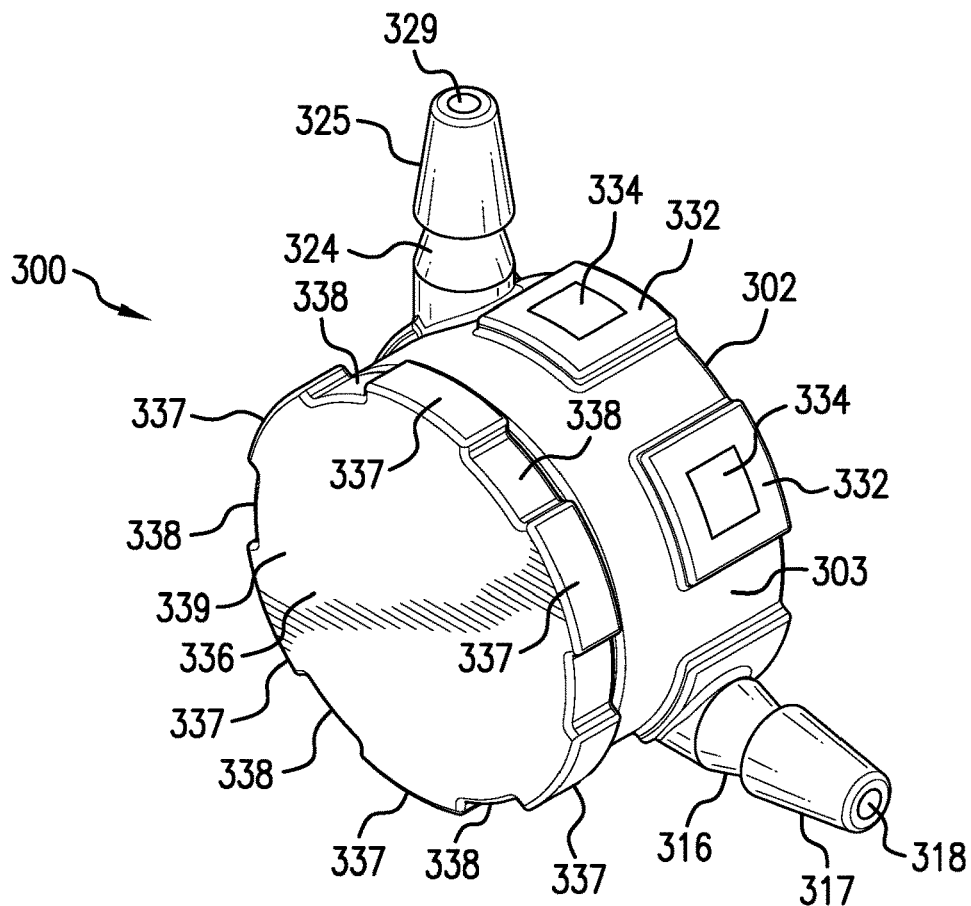
FIG. 19 is a perspective view of another embodiment of a flow meter.
Figure 20:
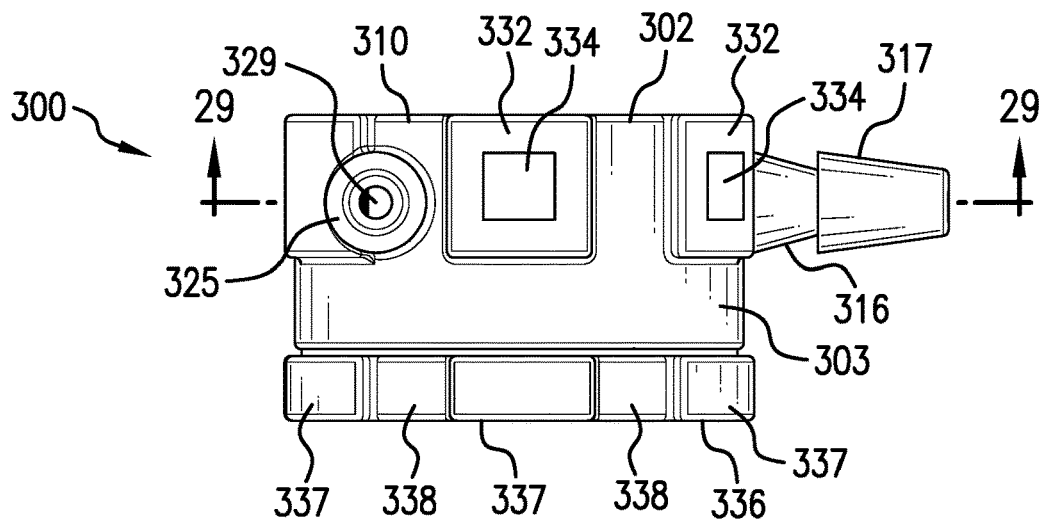
FIG. 20 is a top plan view of the flow meter of FIG. 19.
Figure 21:
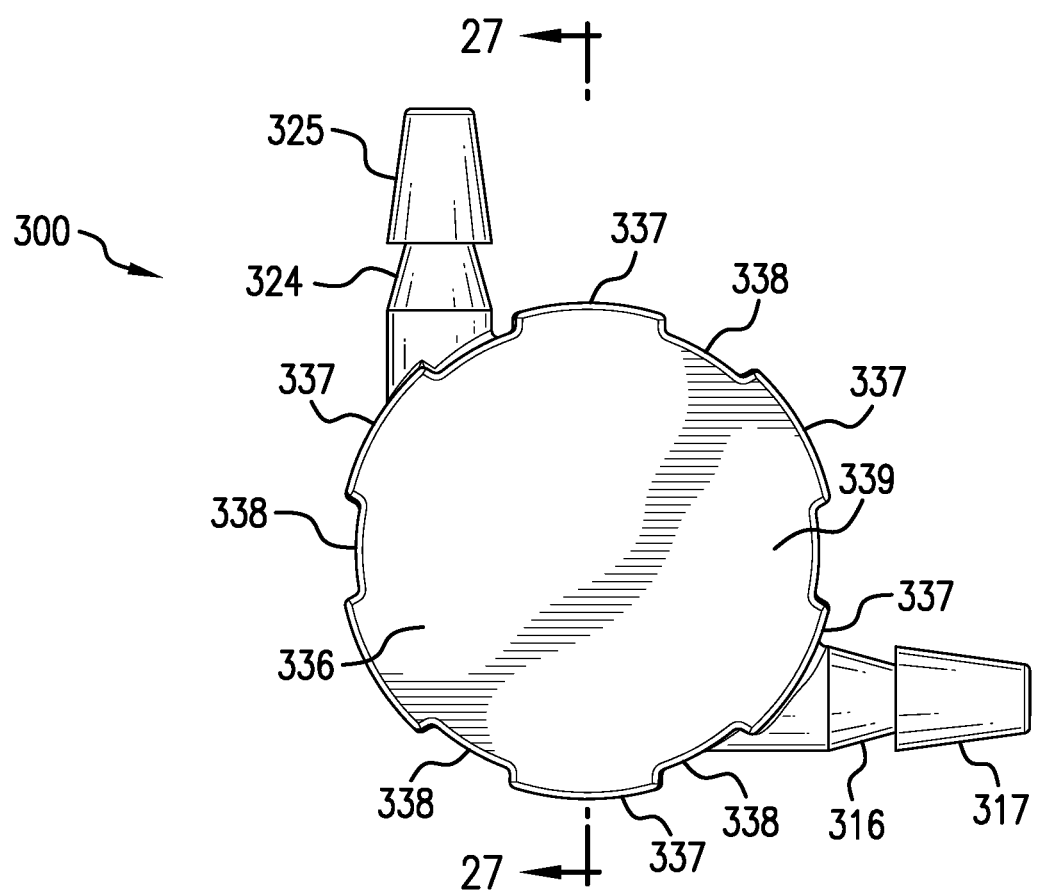
FIG. 21 is front elevational view of the flow meter of FIG. 19.
Figure 22:
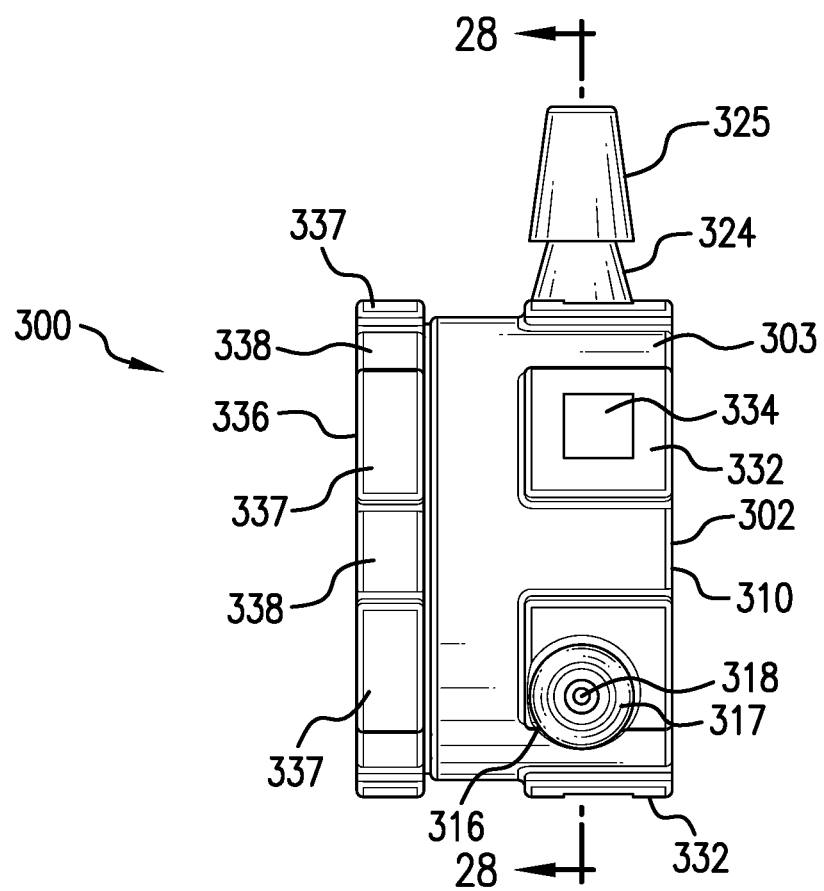
FIG. 22 is a side elevational view of the flow meter of FIG. 19.
Figure 23:
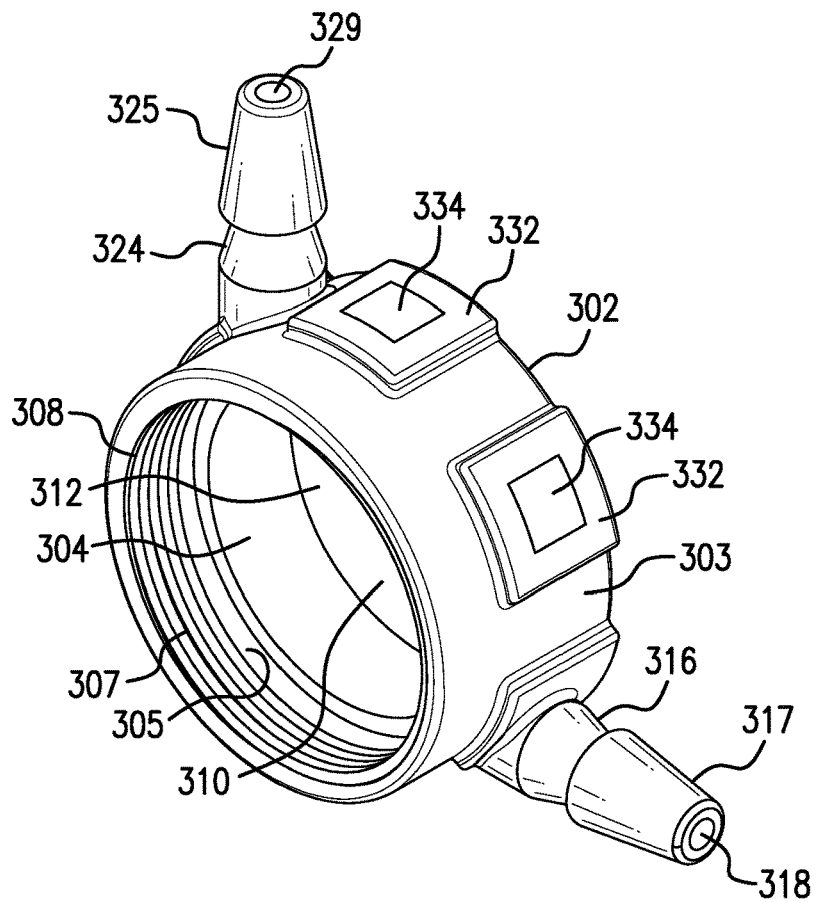
FIG. 23 is a perspective view of a housing of the flow meter of FIG. 19.
Figure 24:
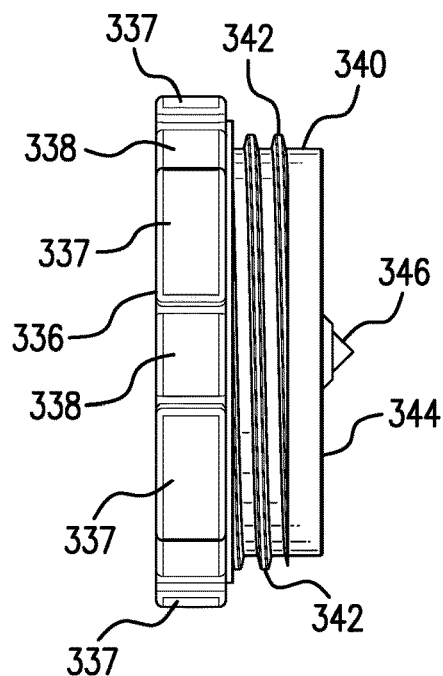
FIG. 24 is a side elevational view of a cover of the flow meter of FIG. 19.
Figure 25:
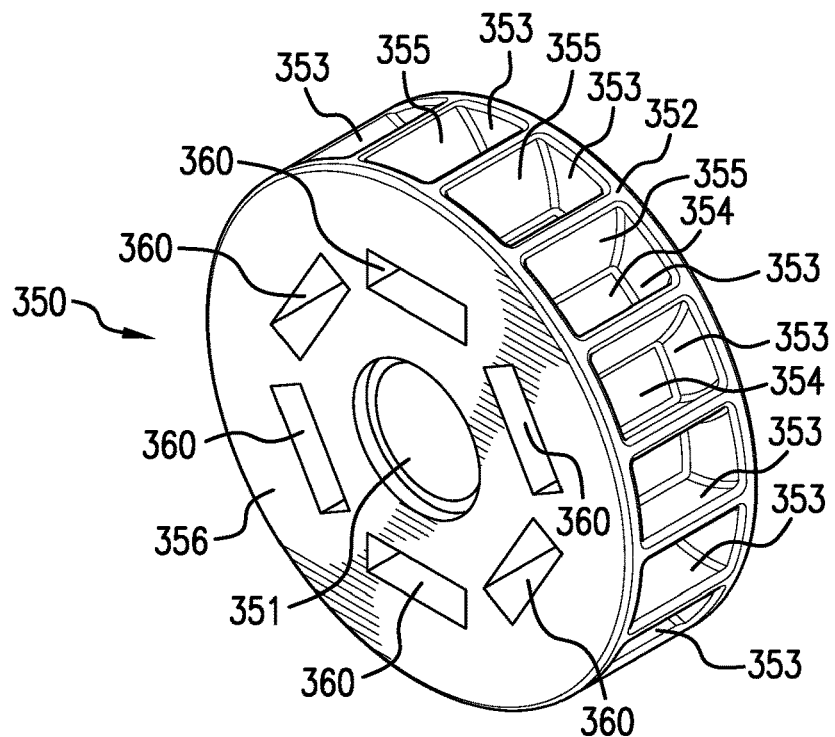
FIG. 25 is a perspective view of a rotatable member of the flow meter of FIG. 19.

In order to use flow meter 300 for the purposes of measuring a person's water consumption, a water tube (not shown) is fluidly attached or connected to portion 317 of external protruding fluid inlet 316. The water tube is fluidly connected to a source of water (e.g. water bottle, canteen, etc. A drinking tube (not shown) is fluidly attached or coupled to portion 325 of external protruding fluid outlet 324. When the person sucks on the drinking tube to extract water, water flows from the source of water into opening 318 and through internal fluid channel 320. The water then exits opening 321. Since the size of internal fluid channel 320 narrows as it approaches opening 321, the water that is emitted from opening 321 is in the form of a narrow steam. The advantages and benefits of such a narrow stream were discussed in the foregoing description. The narrow stream of water strikes inner walls 355 of fluid receptacles 353 thereby causing rotation of rotatable member 350. The movement of magnets 362 causes inductors 334 to generate AC voltage signals. The wiring, rectifier circuitry, energy storage circuitry, signal measurement circuitry and communication circuitry shown in FIG. 18 are also used with flow meter 300 and perform the same functions as described in the foregoing description with respect to flow meter 10. The water then flows into opening 328, through internal fluid channel 326 and then exits opening 329 wherein the water flows through the drinking tube (not shown).

The flow meters disclosed herein provide many advantages and benefits. For example, individuals may attach the flow meter to their existing drinking tubes. Since the flow meters communicate how much water the individual consumes over time, hydration is constantly monitored so as to ensure that the individual stays hydrated and avoid incidents of dehydration and heat exhaustion. The flow meter has negligible back pressure since the rotatable members do not rotate unless there is suction created in the drinking tube. Consequently, the flow meters are significantly more accurate than conventional flow meters. Furthermore, the rotatable members do not rotate when the individual exhibits motion, such as walking or running. The flow meters disclosed herein are substantially smaller in size and have a smaller footprint than conventional flow meters. The flow meters disclosed herein are easy to assembly and disassemble and inexpensive to manufacture. Components of the flow meters may be fabricated from non-toxic and food-safe materials. Certain components of the flow meters (e.g. housings) may be manufactured using 3-D printing techniques. In alternate embodiments, the flow meters disclosed herein are configured to operate using a powered Hall sensor.

The foregoing description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize. In this regard, while the disclosed subject matter has been described in connection with various embodiments and corresponding Figures, where applicable, it is to be understood that other similar embodiments can be used or modifications and additions can be made to the described embodiments for performing the same, similar, alternative or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A flow meter, comprising:
   a housing having an exterior portion, a front portion, a rear portion, an interior region and an internal support structure within the interior region;
   a plurality of inductors attached to and consecutively positioned upon the exterior portion of the housing;
   a front cover attached to the front portion of the housing, the front cover including a body, an external protruding fluid inlet and an interior section that extends within the interior region of the housing, the external protruding fluid inlet including a first internal fluid channel having a first opening and a second opening, wherein the second opening is in fluid communication the interior region of the housing such that fluid entering the first opening flows through the first internal fluid channel and into the interior region of the housing, the external protruding fluid inlet being configured so that the first internal fluid channel is angulated with respect to the body of the front cover by a first predetermined angle so that the fluid exiting the second opening of the first internal fluid channel enters the interior region of the housing at the first predetermined angle;
   a rotatable member disposed within the interior region of the housing and supported by the internal support structure of the housing and the interior section of the front cover so as to allow the rotatable member to rotate about a rotational axis, the rotatable member including a plurality of fins that are oriented so that fluid entering the interior region via the second opening of the first internal fluid channel strikes the fins thereby causing the rotatable member to rotate;
   a plurality of magnets attached to the rotatable member in an alternating magnetic pole arrangement and positioned with respect to the inductors so that rotation of the rotatable member causes the inductors to generate voltage signals; and
   a rear cover attached to the rear portion of the housing and having an external protruding fluid outlet, the external protruding fluid outlet including a second internal fluid channel having a first opening in fluid communication with the interior region of the housing and a second opening to allow fluids to exit the first internal fluid channel, wherein fluids within the interior region of the housing exit the interior region via the second internal fluid channel; and
   whereby fluid flowing into the first internal fluid channel strikes the fins at the predetermined angle so as to cause rotation of the rotatable member wherein movement of the magnets with respect to the inductors causes the inductors to generate voltage signals and whereby the fluid that causes rotation of the rotatable member flows through the interior region of the housing and into the second internal fluid channel.

2. The flow meter according to claim 1 wherein the first internal fluid channel narrows in size as the first internal fluid channel extends from the first opening of the first internal fluid channel to the second opening of the first internal fluid channel.

3. The flow meter according to claim 1 wherein the first predetermined angle is between about 40° and 50°.

4. The flow meter according to claim 1 wherein the rotatable member includes a front side facing the interior section of the front cover and a rear side facing the internal support structure of the housing and wherein the front side includes a plurality of recessed regions, wherein each fin is located within a corresponding recessed region.

5. The flow meter according to claim 4 wherein each fin is angulated inward with respect to the front side by a second predetermined angle.

6. The flow meter according to claim 5 wherein the first predetermined angle is about 45° and the second predetermined angle is about 45° so that fluid exiting the second opening of the first internal fluid channel perpendicularly strikes the fins.

7. The flow meter according to claim 1 wherein the rear cover includes an interior section that extends into the interior region of the housing and which has an opening that is in communication with the second internal fluid channel so as to allow fluid in the interior region to flow into the second internal fluid channel.

8. The flow meter according to claim 7 wherein the internal section of the rear cover has a substantially concave portion that faces the rotatable member and the opening in the interior section of the rear cover is centrally located in the substantially concave portion.

9. The flow meter according to claim 1 wherein the second internal fluid channel has a longitudinally extending axis that is coaxial with the rotational axis.

10. The flow meter according to claim 1 wherein rotatable member has a central opening and wherein the internal support structure has a first protrusion and the interior section of the front cover has a second protrusion, wherein the flow meter further comprises:
    a first bearing mounted on the first protrusion and positioned within the central opening of the rotatable member; and
    a second bearing mounted on the second protrusion and positioned within the central opening of the rotatable member; and
    wherein the first bearing and the second bearing facilitate rotation of the rotatable member about the rotational axis.

11. The flow meter according to claim 1 wherein the voltage signals generated by the inductors are AC voltage signals and the flow meter further comprises:
    conversion circuitry configured to convert the AC voltage signal generated by each inductor into a DC voltage and to sum the DC voltages to generate a cumulative DC voltage; and
    measurement circuitry to convert the cumulative DC voltage into an electrical signal that represents the volume of fluid flowing through the interior region of the housing.

12. The flow meter according to claim 11 further comprising an energy storage circuit to store the cumulative DC voltage.

13. The flow meter according to claim 11 further comprising wireless communication circuitry to wireless transmit the electrical signal representing the volume of fluid flowing through the interior region.

14. A flow meter, comprising:
- a housing comprising an exterior portion, an interior region and a housing opening in communication with the interior region, the housing further comprising a section that is opposite the housing opening and which has an interior surface facing the interior region and a first protrusion protruding from the interior surface, the housing further including an external protruding fluid inlet having a first internal fluid channel, the first internal fluid channel having a first opening, a second opening that is in fluid communication with the interior region of the housing and a first longitudinally extending axis, wherein fluid entering the first opening of the first internal fluid channel flows through the first internal fluid channel and then flows out of the second opening into the interior region of the housing, the housing further including an external protruding fluid outlet having a second internal fluid channel having a first opening in fluid communication with the interior region, a second opening to allow fluid to exit the second internal fluid channel and a second longitudinally extending axis that is orthogonal to the first longitudinally extending axis of the first internal fluid channel;
- a plurality of inductors attached to and consecutively positioned upon the exterior portion of the housing;
- a cover attached to the housing to cover the housing opening, the cover having an interior side that faces the interior region and has a second protrusion that is coaxially aligned with the first protrusion;
- a rotatable member disposed within the interior region of the housing and rotatable upon the first protrusion and the second protrusion, the rotatable member comprising a peripheral portion having a plurality of consecutively positioned fluid receptacles, each fluid receptacle having inner walls that are oriented so that fluid entering the interior region via the second opening of the first internal fluid channel strikes the inner walls thereby causing the rotatable member to rotate;
- a plurality of magnets attached to the rotatable member in an alternating magnetic pole arrangement and positioned with respect to the inductors so that rotation of the rotatable member causes the inductors to generate voltage signals; and
- whereby fluid flowing into the first internal fluid channel flows through the first internal fluid channel and then strikes the inner walls of the fluid receptacles so as to cause rotation of the rotatable member wherein movement of the magnets with respect to the inductors causes the inductors to generate voltage signals and whereby the fluid that causes rotation of the rotatable member flows through the interior region of the housing and enters the second internal fluid channel.

15. The flow meter according to claim 14 wherein the first internal fluid channel narrows in size from the first opening of the first internal fluid channel to the second opening of the first internal fluid channel.

16. The flow meter according to claim 14 wherein the rotatable member is configured to have a central opening and wherein the first protrusion and second protrusion extend into the central opening.

17. The flow meter according to claim 14 wherein the voltage signals generated by the inductors are AC voltage signals and the flow meter further comprises:
- conversion circuitry configured to convert the AC voltage signal generated by each inductor into a DC voltage and to sum the DC voltages to generate a cumulative DC voltage; and
- measurement circuitry to convert the cumulative DC voltage into an electrical signal that represents the volume of fluid flowing through the interior region of the housing.

18. The flow meter according to claim 17 further comprising an energy storage circuit to store the cumulative DC voltage.

19. The flow meter according to claim 17 further comprising wireless communication circuitry to wireless transmit the electrical signal representing the volume of fluid flowing through the interior region.

* * * * *